US012624658B2

(12) United States Patent
Amari et al.

(10) Patent No.: US 12,624,658 B2
(45) Date of Patent: May 12, 2026

(54) STACKED APPROACH FOR DISTRIBUTED HYBRID PROPULSION WITH SCALABILITY AND MODULARITY

(71) Applicant: RTX CORPORATION, Farmington, CT (US)

(72) Inventors: Martin Amari, Glastonbury, CT (US); Zubair A. Baig, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/330,608

(22) Filed: Jun. 7, 2023

(65) Prior Publication Data

US 2024/0410315 A1      Dec. 12, 2024

(51) Int. Cl.
| | |
|---|---|
| *F02C 6/20* | (2006.01) |
| *F02C 6/14* | (2006.01) |
| *H02J 1/10* | (2026.01) |

(52) U.S. Cl.
CPC .................. *F02C 6/20* (2013.01); *F02C 6/14* (2013.01); *H02J 1/106* (2020.01); *F05D 2220/76* (2013.01); *H02J 2310/44* (2020.01)

(58) Field of Classification Search
CPC ...... B64D 27/33; B64D 27/35; B64D 27/355; B64D 27/357; B64D 27/026; B64D 27/02; B64D 31/18; F05D 2230/60; F05D 2230/80; F05D 2220/76; F02C 6/14; F02C 6/20; H02J 2310/44
See application file for complete search history.

(56) References Cited

U.S. PATENT DOCUMENTS

| | | |
|---|---|---|
| 10,855,214 B2 | 12/2020 | Kheraluwala et al. |
| 11,401,041 B2 | 8/2022 | Baig et al. |

(Continued)

FOREIGN PATENT DOCUMENTS

| | | |
|---|---|---|
| EP | 3650353 B1 | 6/2022 |
| WO | 2016093905 A1 | 6/2016 |

OTHER PUBLICATIONS

Search Report issued in European Patent Application No. 24180916.9; Application Filing Date Jun. 7, 2024; Date of Mailing Jul. 5, 2024 (8 pages).

*Primary Examiner* — Phutthiwat Wongwian
*Assistant Examiner* — Roberto Toshiharu Igue
(74) *Attorney, Agent, or Firm* — CANTOR COLBURN LLP

(57) ABSTRACT

A hybrid power and propulsion system of a vehicle is provided and includes an engine assembly coupled to a common bus via a first plug type and including a motor-generator configured to generate electricity, a storage element coupled to the common bus via a second plug type and configured to store the electricity, a drive assembly coupled to the common bus via a third plug type and configured to receive the electricity from at least one of the engine assembly or the storage element to drive a propulsive fan and a controller. The controller is connected to the common bus and controls a flow of the electricity between at least one of the engine assembly, the storage element and the drive assembly. The common bus is configured with additional connectors of the second and third plug types to enable removable connections of additional storage elements and drive assemblies.

18 Claims, 5 Drawing Sheets

(56) References Cited

U.S. PATENT DOCUMENTS

| | | | |
|---|---|---|---|
| 11,520,362 B2 | 12/2022 | Dasgupta et al. | |
| 2018/0291807 A1 | 10/2018 | Dalal | |
| 2020/0023982 A1* | 1/2020 | Kupratis | F02C 6/00 |
| 2020/0184706 A1* | 6/2020 | Speasl | H04L 9/0643 |
| 2021/0394916 A1* | 12/2021 | Baig | H02J 9/061 |
| 2022/0185497 A1 | 6/2022 | Barraco et al. | |
| 2023/0348094 A1* | 11/2023 | List | B64D 45/00 |
| 2024/0034479 A1* | 2/2024 | Detweiler | B60W 10/06 |
| 2024/0043144 A1* | 2/2024 | Maldonado | B64U 10/70 |

* cited by examiner

400

401 — Receive missing parameters

402 — Ascertain system configuration

403 — Determine whether system configuration accords with mission parameters

No → 404 — Send signal that system configuration does not satisfy mission parameters

Yes

405 — Provide positive indication

406 — Control power flow

STACKED APPROACH FOR DISTRIBUTED HYBRID PROPULSION WITH SCALABILITY AND MODULARITY

BACKGROUND

The present disclosure relates to aircraft and, in particular, to a stacked approach for distributed hybrid propulsion with scalability and modularity.

The term hybrid power generally refers to combinations of different technologies to produce power. For example, in power engineering, hybrid power can refer to a combination of power drawn from a gas turbine engine and power drawn from batteries. The advantage of hybrid power is that one power generation mode can supplement or replace the other to address current conditions. For example, in an aircraft, battery power can be used to supplement gas turbine engine power during high-power flight regimes or to replace a gas turbine engine that is inoperative. Conversely, the gas turbine engine can be used to recharge the battery.

SUMMARY

According to an aspect of the disclosure, a hybrid power and propulsion system of a vehicle is provide and includes an engine assembly operably coupled to a common bus via a first plug type, wherein the engine assembly comprises a motor-generator configured to generate electricity, a storage element operably coupled to the common bus via a second plug type, wherein the storage element is configured to store the electricity, a drive assembly operably coupled to the common bus via a third plug type, wherein the drive assembly is configured to receive the electricity from at least one of the engine assembly or the storage element to drive a propulsive fan and a controller operably connected to the common bus and including a processor and a non-transitory computer-readable memory storing instructions that, when executed, cause the processor to control a flow of the electricity between at least one of the engine assembly, the storage element and the drive assembly. The common bus is configured with at least two connectors of the second plug type and the third plug type to enable two or more storage elements and two or more drive assemblies to be removably connected to the hybrid power and propulsion system.

In accordance with additional or alternative embodiments, the instructions further cause the processor to determine a system configuration based on connections to the common bus via the first plug type, the second plug type and the third plug type, receive a mission input comprising one or more mission parameters; and, based on the one or more mission parameters, determine whether the system configuration is sufficient for the one or more mission parameters.

In accordance with additional or alternative embodiments, the instructions further cause the processor to determine the system configuration is sufficient for the one or more mission parameters and cause a message to be presented via a display of an operator or maintenance computing device indicating that the system configuration is sufficient.

In accordance with additional or alternative embodiments, the instructions further cause the processor to determine the system configuration is not sufficient for the one or more mission parameters and cause a message to be presented via a display of an operator or maintenance computing device indicating that the system configuration is insufficient, wherein the message comprises an indication to add at least one storage element or at least one drive assembly to the hybrid power and propulsion system.

In accordance with additional or alternative embodiments, the instructions further cause the processor to determine the system configuration includes excess components for the one or more mission parameters and cause a message to be presented via a display of an operator or maintenance computing device indicating that the system configuration is excessive, wherein the message comprises an indication to remove at least one storage element or at least one drive assembly from the hybrid power and propulsion system.

In accordance with additional or alternative embodiments, the hybrid power and propulsion system includes a set of loads and the instructions further cause the processor to control a flow of power to the set of loads and bi-directional flows of power across the common bus.

In accordance with additional or alternative embodiments, the engine assembly further includes an engine and a motor-generator coupled with the engine.

In accordance with additional or alternative embodiments, the energy storage element includes at least one of a battery or a fuel cell.

In accordance with additional or alternative embodiments, the drive assembly includes a fan or rotor, a motor-generator coupled with the fan or rotor and a motor drive electrically interposed between the motor-generator and the common bus.

According to an aspect of the disclosure, a hybrid power and propulsion system is provided and includes at least one auxiliary engine assembly, one or more energy storage elements, one or more drive assemblies, a common bus including at least one first plug to which the at least one auxiliary engine assembly is connectable, second plugs to which one or more energy storage elements is connectable and third plugs to which one or more drive assemblies is connectable and a controller operably coupled to the common bus and configured to ascertain a system configuration from respective connections to the first, second and third plugs.

In accordance with additional or alternative embodiments, the hybrid power and propulsion system further includes a set of loads and the controller is further configured to control a flow of power to the set of loads and bi-directional flows of power with respect to each of the first, second and third plugs.

In accordance with additional or alternative embodiments, the auxiliary engine assembly includes a gas turbine engine and a motor-generator coupled to the gas turbine engine and configured to drive at least one spool of the gas turbine engine in a first engine configuration and to generate electricity in a second engine configuration.

In accordance with additional or alternative embodiments, at least one of the one or more energy storage elements includes a battery.

In accordance with additional or alternative embodiments, at least one of the one or more energy storage elements includes a fuel cell.

In accordance with additional or alternative embodiments, at least one of the one or more drive assemblies includes a fan or rotor, a motor-generator coupled with the fan or rotor and a motor drive electrically interposed between the motor-generator and the common bus.

In accordance with additional or alternative embodiments, each of the one or more drive assemblies includes a pair of ducted rotors coupled to a motor-generator configured to drive the pair of ducted rotors.

In accordance with additional or alternative embodiments, the controller is further configured to receive mission parameters associated with a mission for a vehicle associated with the hybrid power and propulsion system, determine that a system configuration includes excess components based on the mission parameters and cause at least one energy storage element or drive assembly to be removed from the hybrid power and propulsion system.

In accordance with additional or alternative embodiments, the controller is further configured to receive mission parameters associated with a mission for a vehicle associated with the hybrid power and propulsion system, determine that a system configuration is insufficient to complete the mission based on the mission parameters and cause at least one energy storage element or drive assembly to be added to the hybrid power and propulsion system.

According to an aspect of the disclosure, a method of configuring a vehicle propulsion system is provided and includes receiving mission parameters, ascertaining a system configuration from respective connections of an auxiliary engine assembly, one or more energy storage elements and one or more drive assemblies to first, second and third plugs of a common bus and determining whether the system configuration accords with the mission parameters.

In accordance with additional or alternative embodiments, the method further includes, based on a determination that the system configuration accords with the mission parameters, causing a first message to be presented via a display of a computing device, the first message including an indication that the system configuration accords with the mission parameters or, based on a determination that the system configuration does not accord with mission parameters, causing a second message to be presented via the display, the second message including an instruction to either add or remove a component to/from the vehicle propulsion system.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
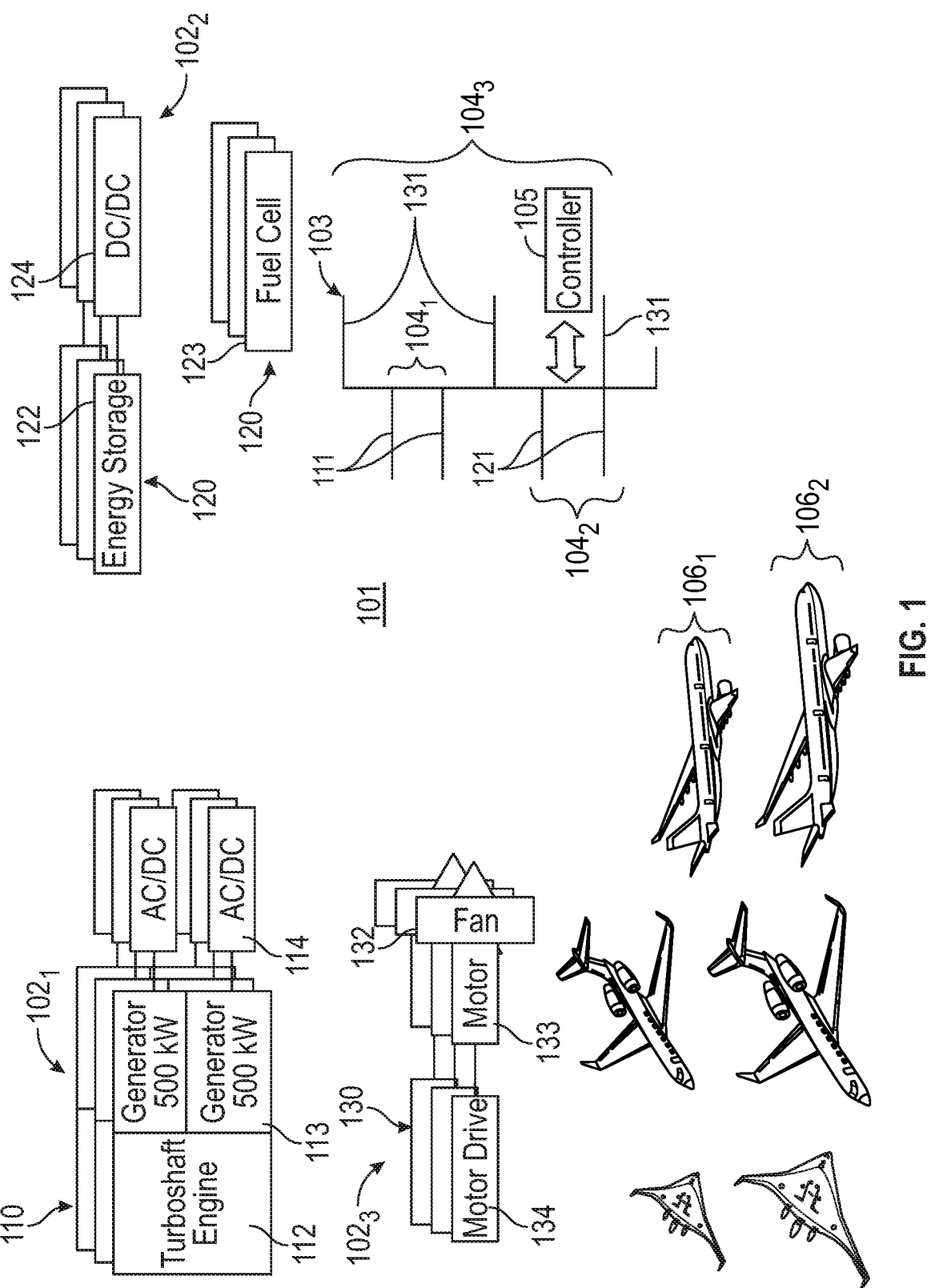
FIG. 1 is a schematic illustration of components of a distributed hybrid propulsion system of a vehicle in accordance with embodiments.

In a serial hybrid power and propulsion system, power is distributed from a power source to a propulsor to generate thrust. In such a system, power can be generated and consumed at either end of the system. For example, power can be generated by motor-generators coupled to and powered by a gas turbine engine at a first end of the system and/or power can be generated by motor-generators coupled to propulsive rotors (e.g., rotors that produce thrust and/or lift) at a second end of the system.

Conventional hybrid power and propulsion systems require substantial integration of disparate components, and oftentimes each of the components are provided by different sources (e.g., different manufacturers). This integration is required to ensure the disparate components are configured to communicate and/or otherwise function collaboratively to make the hybrid power and propulsion system work. Due to the substantial integration of disparate components, these conventional hybrid power and propulsion systems include fixed configurations that are typically rigid and unalterable. That is, once integration is complete, the traditional systems are configured to generate a fixed amount of energy and/or propulsive power.

To address the shortcomings of the conventional systems, described herein is a modularized hybrid power and propulsion system that is versatile and scalable. That is, the present disclosure describes a plug-and-play or modularized, stacked approach for creating and controlling a hybrid power and propulsion system that may be used to power multiple platforms of disparate types and sizes. For example, a first platform (e.g., vehicle (e.g., aircraft, automobile, truck, vessel, etc.)) may include a first number of components (e.g., motors, fans, batteries, etc.) to provide sufficient energy to power the first platform and a second platform may include a second number of a same or similar type of components to provide sufficient energy to power the second platform. Thus, the first platform and the second platform may include a different number of same or similar components. For another example, a platform may include a first number of components to provide sufficient energy to power the platform for a first mission (e.g., traveling a first distance, carrying a first payload, etc.) and it may later be modified to include a second number of components to provide sufficient energy to power the platform for a second mission (e.g., traveling a second distance, carrying a second payload, etc.). In other words, various components may be added or removed based on the platform and/or an associated mission.

As described below, the hybrid power and propulsion system includes a controller configured to dynamically control power demand (two-way) for power supply and/or power generation and to direct power to associated components installed on the platform via a common bus. Though described herein as being associated with a vehicle, with specific examples directed to aircraft, this is not intending to be so limiting, and the hybrid power and propulsion system described herein may be used in association with any platform, mobile or stationary.

With reference to FIG. 1, a hybrid power and propulsion system 101 is provided for use with a vehicle, such as an aircraft. The hybrid power and propulsion system 101 includes respective pluralities of multiple classes of vehicle components 102$_1$, 102$_2$, 102$_3$, a common bus 103 that includes respective pluralities of multiple classes of plugs 104$_1$, 104$_2$, 104$_3$ to which corresponding ones of the respective pluralities of multiple classes of vehicle components 102$_1$, 102$_2$, 102$_3$ are connectable and a controller 105. The controller 105 is operably coupled to the common bus 103 and configured to ascertain a system configuration from connections to the common bus 103.

The controller 105 can include a processing unit, a memory unit and an input-output (I/O) unit by which the processing unit is communicative with external elements. The memory unit is a non-transitory storage medium and has executable instructions stored thereon, which are readable and executable by the processing unit. When the executable instructions are read and executed by the processing unit, the processing unit and the controller 105 generally operate as described herein.

In greater detail, in accordance with embodiments, the hybrid power and propulsion system 101 can include one or more auxiliary engine assemblies 110, one or more energy storage elements 120 and one or more drive assemblies 130. The common bus 103 can include first plugs 111 to which each one of the one or more auxiliary engine assemblies 110 is connectable, second plugs 121 to which each one of the one or more energy storage elements 120 is connectable and third plugs 131 to which each one of the one or more drive assemblies 130 is connectable. The controller 105 is operably coupled to the common bus 103. The controller 105 is configured to ascertain a system configuration from connections of the one or more auxiliary engine assemblies 110 to the first plugs 111, from connections of the one or more energy storage elements 120 to the second plugs 121 and from connections of the one or more drive assemblies 130 to the third plugs 131.

In some cases, the controller 105 can be further configured to determine whether the system configuration accords with mission parameters prescribed for the vehicle. For example, the controller 105 can be configured to receive an input associated with a mission for the aircraft powered by the hybrid power and propulsion system 101. The controller 105 may evaluate one or more mission parameters (e.g., distance to be traveled, altitude, payload, etc.) associated with the mission to determine whether the components are optimized for mission completion. For example, the controller 105 may determine, based on the mission parameters for a first mission, that excess components are associated with the hybrid power and propulsion system 101 onboard a vehicle. The controller 105 may then provide an alert to recommend removal of one or more components of the hybrid power and propulsion system 101 in order to optimize performance of the vehicle throughout the mission. For another example, the controller 105 may determine, based on mission parameters, that additional components need to be added to the vehicle to successfully complete the mission. Based on the determination, the controller 105 may then provide an alert instructing an operator or maintenance person to add additional components, to ensure successful mission completion.

At least one of the one or more auxiliary engine assemblies 110 can include an engine 112, such as a turboshaft engine, one or more motor-generators 113 that are respectively coupled with the engine 112 to either drive an operation or the engine 112 or to generate electrical power from the operation of the engine 112 and, in some cases, inverters 114 (e.g., alternating current (AC)/direct current (DC) inverters) that are electrically interposable between each of the one or more motor-generators 113 and the common bus 103. In at least one embodiment, the engine 112 may be configured as a non-thrust/lift generating engine. In other words, the engine 112 may be configured to not generate motive power or thrust/lift for the vehicle (e.g., auxiliary power unit, etc.).

At least one of the one or more energy storage elements 120 can include a battery 122 or a fuel cell 123. In either case, an inverter 124 (e.g., a DC/DC inverter) can be electrically interposable between the battery 122/fuel cell 123 and the common bus 103.

At least one of the one or more drive assemblies 130 can include one or more fans or rotors 132, a motor-generator 133 coupled with the one or more fans or rotors 132 to drive operations of the one or more fans or rotors 132 and a motor drive 134 that controls operations of the motor-generator 133 and that is electrically interposable between the motor-generator 133 and the common bus 103. Although illustrated in FIG. 1 as a component separate from the motor 133, this is not intended to be so limiting, and the motor drive 134 may be incorporated into the motor 133, such as a component thereof.

In some embodiments, the motor-generators 133 and fans or rotors 132 may be removably coupled to the hybrid power and propulsion system 101 such that the motor-generators 133 and fans or rotors 132 may be added and/or removed based on mission needs and/or thrust/lift requirements of a vehicle. For example, the hybrid power and propulsion system 101 may include two motor-generators 133 coupled to respective fans or rotors 132 in a first configuration and may include eight motor-generators 133 coupled to respective fans or rotors 132 in a second configuration. A greater or fewer number of motor-generators 133 and fans or rotors 132 is contemplated herein along with other types of component additions and removals, as described below.

As described above, the hybrid power and propulsion system 101 can be scaled for various mission types. That is, the common bus 103 can have one or more auxiliary engine assemblies 110, one or more energy storage elements 120 and one or more drive assemblies 130 connected thereto and the controller 105 is configured to operate with any and all of the connection options. The scalability of the hybrid power and propulsion system 101 reduces or eliminates a need for re-engineering or restructuring of a vehicle for each mission to which that vehicle is assigned and further reduces or eliminates a need for manual re-programming of the controller 105 each time the controller 105 encounters a new configuration.

In accordance with embodiments, each one of the one or more auxiliary engine assemblies 110, each one of the one or more energy storage elements 120 and each one of the one or more drive assemblies 130 is modular. As such, at least one of the one or more auxiliary engine assemblies 110 can be of a unique type (i.e., with a unique structure, operational capabilities, structure, etc.) that is connectable nonetheless with the first plugs 111, at least one of the one or more energy storage elements 120 can be of a unique type (i.e., with a unique structure, operational capabilities, structure, etc.) that is connectable nonetheless with the second plugs 121 and at least one of the one or more drive assemblies 130 can be of a unique type (i.e., with a unique structure, operational capabilities, structure, etc.) that is connectable nonetheless with the third plugs 131. The modularity of each one of the one or more auxiliary engine assemblies 110, of each one of the one or more energy storage elements 120 and of each one of the one or more drive assemblies 130 offers several advantages including, but not limited to, the ability for any one or more of the auxiliary engine assemblies 110, any one or more of the energy storage elements 120 and any one or more of the drive assemblies 130 to be sourced from varied and unique sources.

The hybrid power and propulsion system 101 can further be configured to provide propulsion to a plurality of vehicles of different sizes. In the illustrative example of FIG. 1, the hybrid power and propulsion system 101 can be configured to provide propulsion to different airframes of various sizes $106_1$, $106_2$ in which the system configuration is disposed. Each one of the plurality of airframes of one or more of the various sizes $106_1$, $106_2$ is configured to accommodate a hybrid power and propulsion system 101 in one or more different configurations as described above, such as based on mission requirements.

Figure 2:
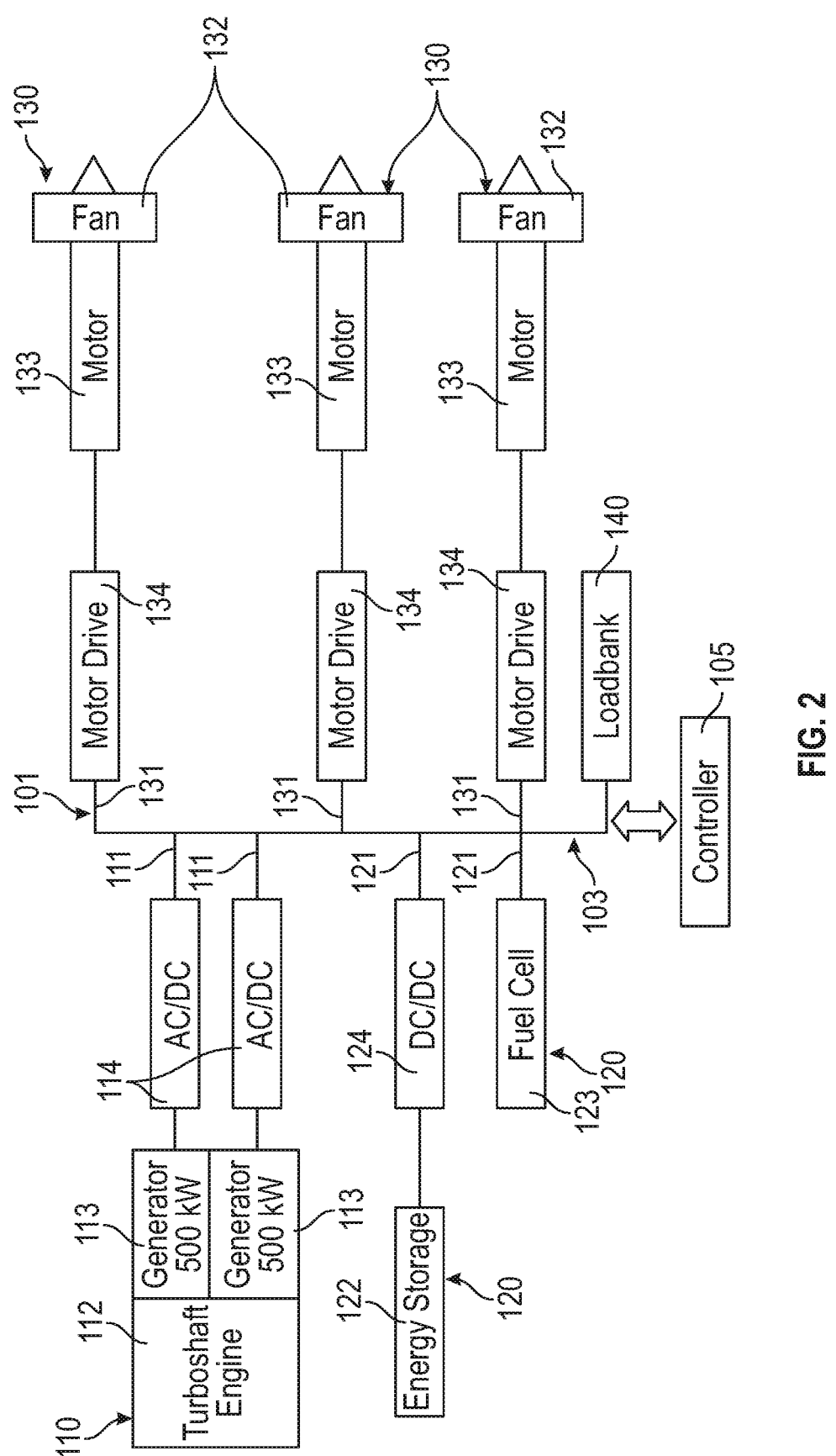
FIG. 2 is a schematic illustration of installed components of a system configuration of a distributed hybrid propulsion system of a vehicle in accordance with embodiments.
Figure 3:
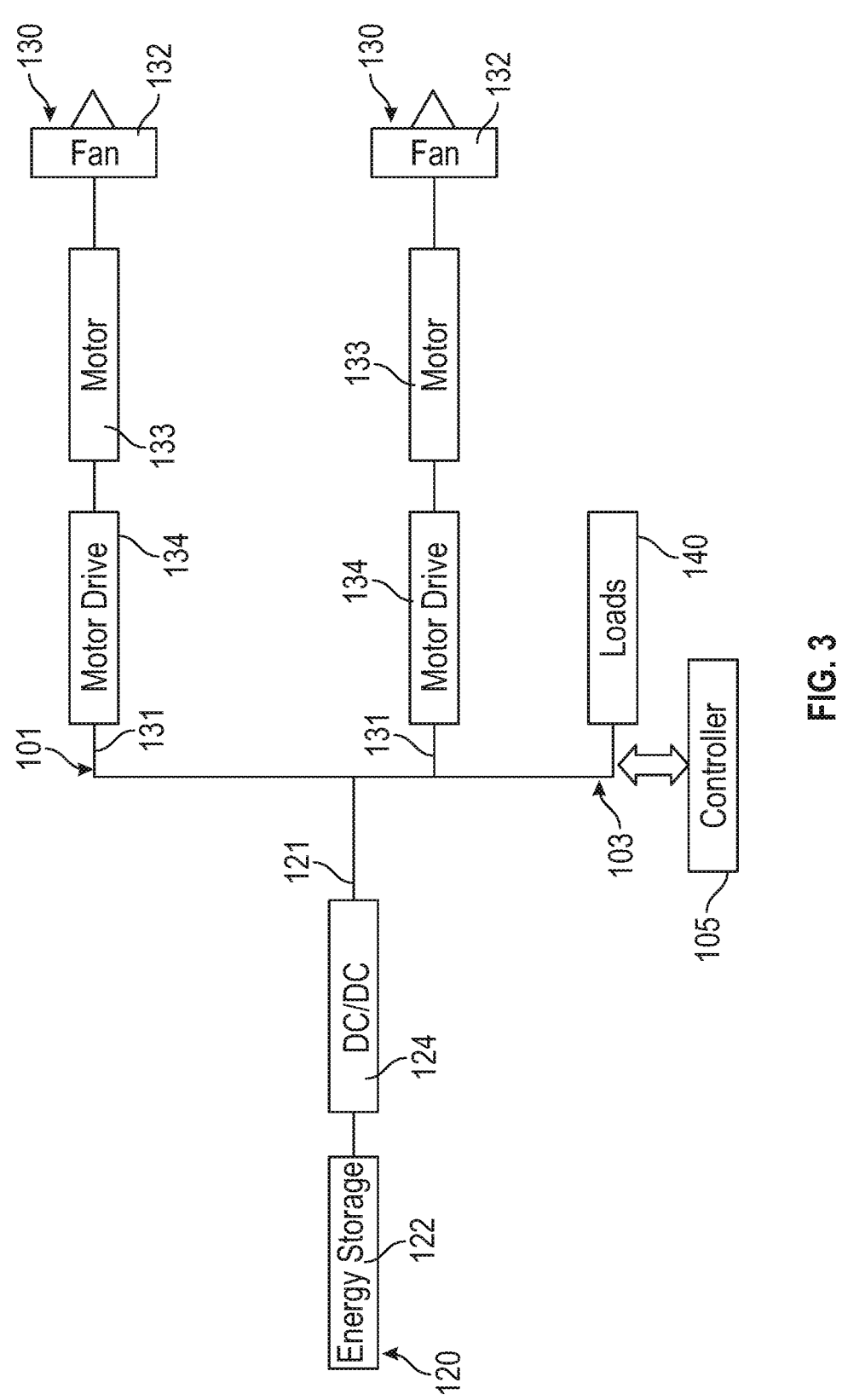
FIG. 3 is a schematic illustration of installed components of another system configuration of a distributed hybrid propulsion system of a vehicle in accordance with embodiments.

With reference to FIGS. 2 and 3, exemplary system configurations of the hybrid power and propulsion system 101 of FIG. 1 are provided.

As shown in FIG. 2, the hybrid power and propulsion system 101 can include an auxiliary engine assembly 110 with a single engine 112, two motor-generators 113 that are respectively coupled with the single engine 112 to either drive an operation of the single engine 112 or to generate electrical power from an operation of the single engine 112, and AC/DC inverters 114 that are electrically interposable between each of the one or more motor-generators 113 and first plugs 111 of the common bus 103. In addition, the hybrid power and propulsion system 101 of FIG. 2 can include two energy storage elements 120, one with a battery 122 and a DC/DC inverter 124 interposed between the battery 122 and a second plug 121 of the common bus 103 and one with a fuel cell 123 that is directly connected a second plug 121 of the common bus 103. Also, the hybrid power and propulsion system 101 of FIG. 2 can include three drive assemblies 130, each including at least one fan or rotor 132, a motor-generator 133 coupled with the at least one fan or rotor 132 to drive operations of the fan or rotor 132 and a motor drive 134 that controls operations of the motor-generator 133 and that is electrically interposable between the motor-generator 133 and a third plug 131 of the common bus 103. In some embodiments, the motor drive 134 may control operation of the motor-generator 133 to cause the at least one fan or rotor 132 to operate and/or to operate at a particular speed. In embodiments in which two or more fans or rotors 132 are associated with a particular motor-generator 133, the motor drive 134 may be configured to control the motor-generator 133 to operate the two or more fans or rotors 132 at a same or similar or different speed. For example, the motor drive 134 may send a signal to the motor-generator 133 to cause the operation of a first fan or rotor 132 at a first speed and a second fan or rotor 132 at a second speed that is greater than the first speed. In at least one example, the motor drive 134 may generate the signal to the motor-generator 133 based on an input signal from the controller 105. In such an example, the controller 105 may be configured to drive the fan(s) or rotor(s) 132 of the hybrid power and propulsion system 101 via the motor drive 134 and/or the motor-generator 133.

It can be assumed that the hybrid power and propulsion system 101 of FIG. 2 can be associated with an airframe of a certain size (e.g., size $106_1$), which is sufficient for supporting the above-described system configuration but which is not excessively large as compared to the above-described system configuration, and a set of loads 140 (e.g., on-board sensors, computing devices, environmental control systems (ECSs), etc.) that can each draw power from one of the power generation components during the mission.

In the hybrid power and propulsion system 101 of FIG. 2, the controller 105 is operably coupled to the common bus 103 and configured to ascertain the above-described system configuration from each of the respective connections to the first plugs 111, the second plugs 121 and the third plugs 131. The controller 105 is further configured to be receptive of mission parameters and to determine whether the system configuration accords with the mission parameters and the requirements of the set of loads 140. If the controller 105 determines that the system configuration is appropriate for the mission parameters and the requirements of the set of loads 140, the controller 105 can issue a positive signal to an operator and/or maintenance person. In this case, no system configuration changes would be necessary (e.g., no removal or addition of components). If the controller 105 determines that the system configuration is insufficient for the mission parameters and the requirements of the set of loads 140 (i.e., the system configuration lacks sufficient battery power), the controller 105 can issue an appropriate signal to the operator and/or maintenance person (e.g., that an additional battery 122 is required) to add additional components (e.g., add motor drive 134, motor-generator 133 and fan or rotor 132, add batteries, etc.). Additionally, if the controller 105 determines that the system configuration is excessive for the mission parameters and the requirements of the set of loads 140, the controller can issue an appropriate signal to remove components. The signal can include an alert that the system configuration is satisfactory, insufficient, or excessive, and/or a recommendation of one or more modifications to make to the system configuration.

In addition to the operations described above, the controller 105 is configured to control a flow of power to the set of loads 140, to control bi-directional flows of power with respect to each of the first plugs 111, the second plugs 121 and the third plugs 131 of the common bus 103 that are in use. The controller can be configured to take into consideration the bi-directional power flow capability in determining whether the system configuration accords with the mission parameters and the requirements of the set of loads 140. As such, the controller 105 can consider the possibility of the battery 122 being recharged by the auxiliary engine assembly 110 during the mission to thereby meet the requirements of the set of loads 140 instead of recommending the insertion of an additional battery 122. The controller 105 may determine the re-charging capabilities of the batteries 122 based on the flight profile associated with the mission, such as a time to climb to altitude, a time at cruise, a time in descent, and the like.

As shown in FIG. 3, the hybrid power and propulsion system 101 can include an energy storage element 120, with a battery 122 and a DC/DC inverter 124 interposed between the battery 122 and a second plug 121 of the common bus 103, and two drive assemblies 130, each including at least one fan or rotor 132, a motor-generator 133 coupled with the at least one fan or rotor 132 to drive operations of the at least one fan or rotor 132 and a motor drive 134 that controls operations of the motor-generator 133 and that is electrically interposable between the motor-generator 133 and a third plug 131 of the common bus 103.

Again, it can be assumed that the hybrid power and propulsion system 101 of FIG. 3 can further include an air frame of a certain size $106_1$, which is sufficient for supporting the above-described system configuration, and a set of loads 140 that draws power from one of the power generation components during the mission.

In the hybrid power and propulsion system 101 of FIG. 3, the controller 105 is operably coupled to the common bus 103 and configured to ascertain the above-described system configuration from each of the respective connections to the second plug 121 and the third plugs 131. The controller 105 is further configured to receive mission parameters, such as from an external source (e.g., mission computer input, etc.) and to determine whether the system configuration accords with the mission parameters and the requirements of the set of loads 140. If the controller 105 determines that the system configuration is appropriate for the mission parameters and the requirements of the set of loads 140, the controller 105 can issue a positive signal to an operator.

In addition to the operations described above, the controller 105 is configured to control a flow of power to the set of loads 140, to control bi-directional flows of power with respect to each of the second plugs 121 and the third plugs 131 of the common bus 103 that are in use and to take into consideration the bi-directional power flow capability in determining whether the system configuration accords with the mission parameters and the requirements of the set of loads 140. As such, the controller 105 can consider the possibility of the battery 122 being recharged by one of the two engines 130 during the mission to thereby meet the requirements of the set of loads 140 instead of adding an additional battery 122.

Figure 4:
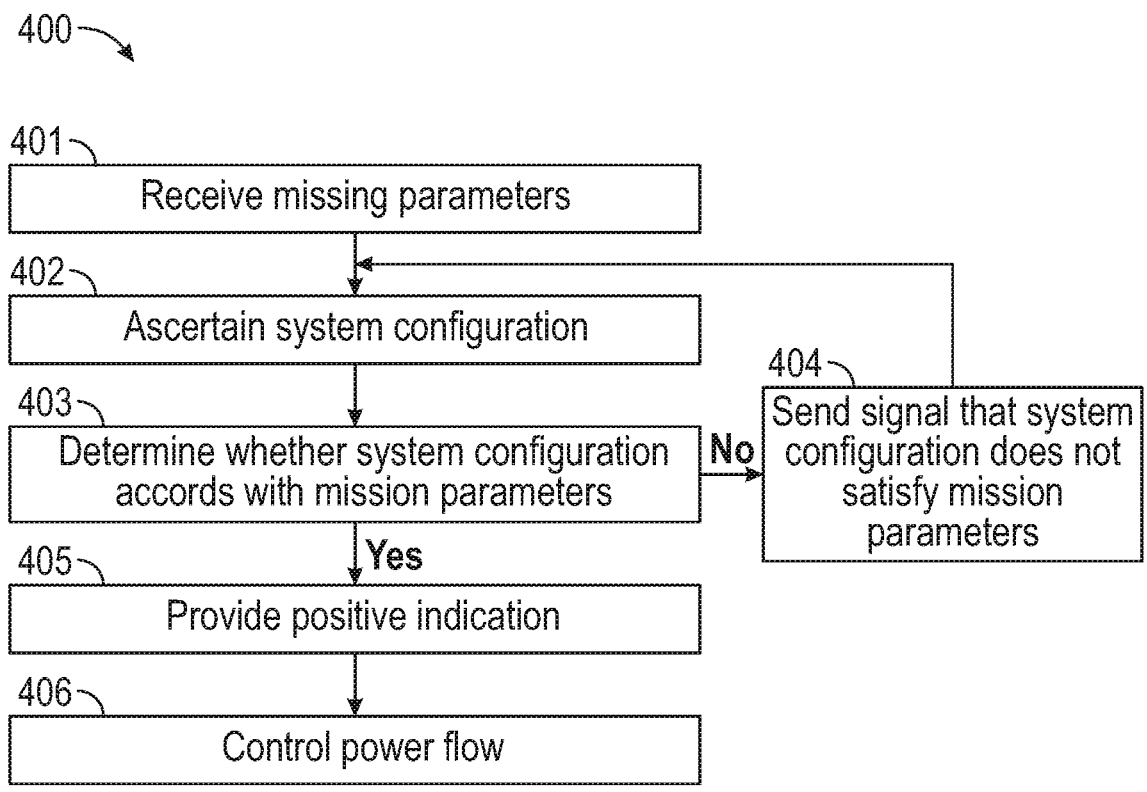
FIG. 4 is a flow diagram illustrating a method of configuring a vehicle in accordance with embodiments.

With reference to FIG. 4, a method 400 of configuring a vehicle, such as an aircraft of various types and sizes, is provided. At block 401, the method 400 includes receiving, at a controller 105, mission parameters. In various embodiments, the mission parameters may be received from an external source, such as a mission signal input from a mission computing device. In some embodiments, the mission parameters may be input via a mission console of the aircraft, such as via a flight management computer or the like.

At block 402, the controller 105 ascertains (e.g., determines) a system configuration from respective connections of one or more auxiliary engine assemblies (at least one of which is of a unique type), one or more energy storage elements (at least one of which is of a unique type) and one or more drive assemblies (at least one of which is of a unique type) to first, second and third plugs of a common bus. In other words, the controller 105 can determine a number components coupled to the first plug, second plug and/or third plug, and can determine the system configuration based on the couplings.

At block 403, the controller 105 determines whether the system configuration satisfies the mission parameters. For example, the controller 105 determines whether the system configuration can produce enough electrical power to drive the fans or rotors 132 throughout the entirety of the mission based on the mission parameters, such as distance, altitude gained, payload to be carried, and the like. Based on a determination that the system configuration does not satisfy the mission parameters ("No" at block 403), the controller 105, at block 404, generates and sends a signal to an operator/maintenance person to indicate that the system configuration does not satisfy mission parameters. In some embodiments, the signal can include a recommendation to add and/or remove particular components to satisfy the mission parameters. Based on a determination that the system configuration satisfies the mission parameters ("Yes" at block 403), the controller 105 can provide an indication thereof at block 405.

At block 406, the controller 105 can control a bi-directional power flow with respect each of the first, second and third plugs during mission operations.

Figure 5:
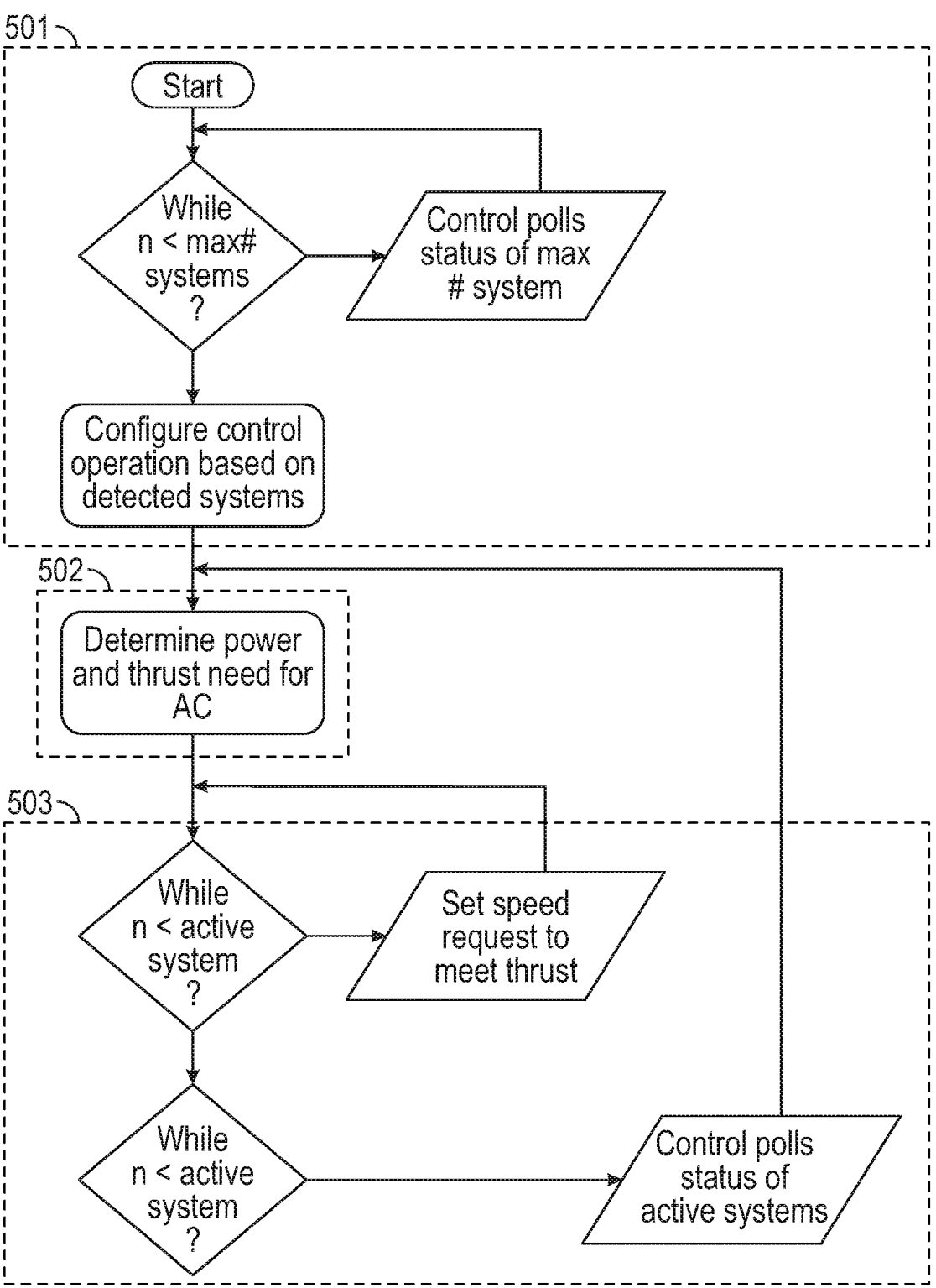
FIG. 5 is a flow diagram illustrating an operational method of a controller controlling a distributed hybrid propulsion system of a vehicle in accordance with embodiments.

With reference to FIG. 5, a further operational method of the controller 105 described above is provided. As shown in FIG. 5, the controller 105 initially checks for active systems and system health at start-up or as needed (section 501). In the above-described scalable and modular hybrid power and propulsion system 101, this is where the controller 105 determines which system configuration has been chosen for a given mission with polling done via network or bus communications. Next, based on vehicle or aircraft needs, the controller 105 determines effector settings to meet power distribution demands and thrust goals (section 502). The controller 105 continues monitoring active systems and adjusts as needed (section 503).

Technical effects and benefits of the present disclosure are the provision of a hybrid power and propulsion system of a vehicle in which a serial hybrid configuration and a controller enables scalability and modularity that provides improved versatility in system designs. The controller allows for addition and removal of components without requiring complete restructuring or rebuilding of the system in question. The controller allows for the modularity that is not achieved in prior systems that require rework when components are added or removed.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hybrid power and propulsion system of a vehicle, comprising:

an engine assembly operably coupled to a common bus via a first plug type, wherein the engine assembly comprises a motor-generator configured to generate electricity;

a storage element operably coupled to the common bus via a second plug type, wherein the storage element is configured to store the electricity;

a drive assembly operably coupled to the common bus via a third plug type, wherein the drive assembly is configured to receive the electricity from at least one of the engine assembly or the storage element to drive a propulsive fan; and a controller operably connected to the common bus and comprising a processor and a non-transitory computer-readable memory storing instructions that, when executed, cause the processor to control a flow of the electricity between at least one of the engine assembly, the storage element and the drive assembly, wherein the common bus is configured with at least two connectors of the second plug type to enable two or more storage elements, wherein each of the two or more storage elements is provided with a unique type of structure and has a unique set of operational capabilities and is sourced from varied and unique sources, to be removably connected at a same time to the hybrid power and propulsion system and at least two connectors of the third plug type to enable two or more drive assemblies each with unique structure and operational capabilities and each being sourced from varied and unique sources to be removably connected at a same time to the hybrid power and propulsion system, wherein, during a configuring of the vehicle, the instructions further cause the processor to:

determine a system configuration based on connections to the common bus via the first plug type, the second plug type and the third plug type;

receive a mission input comprising one or more mission parameters;

based on the one or more mission parameters, determine whether the system configuration is insufficient, sufficient or excessive for the one or more mission parameters; and indicate:

where the system configuration is determined to be insufficient, adding at least one drive assembly to the hybrid power and propulsion system, and where the system configuration is determined to be excessive, removing at least one drive assembly from the hybrid power and propulsion system.

2. The hybrid power and propulsion system according to claim 1, wherein, in an event the system configuration is determined to be sufficient during the configuring of the vehicle, the instructions further cause the processor to:

cause a message to be presented via a display of an operator or maintenance computing device indicating that the system configuration is sufficient.

3. The hybrid power and propulsion system according to claim 1, wherein, in an event the system configuration is determined to be insufficient during the configuring of the vehicle, the instructions further cause the processor to:

cause a message to be presented via a display of an operator or maintenance computing device indicating that the system configuration is insufficient, wherein the message comprises an indication to add the at least one drive assembly to the hybrid power and propulsion system.

4. The hybrid power and propulsion system according to claim 1, wherein, in an event the system configuration is determined to be excessive during the configuring of the vehicle, the instructions further cause the processor to:

cause a message to be presented via a display of an operator or maintenance computing device indicating that the system configuration is excessive, wherein the message comprises an indication to remove the at least one drive assembly from the hybrid power and propulsion system.

5. The hybrid power and propulsion system according to claim 1, further comprising a set of loads, wherein the instructions further cause the processor to control a flow of power to the set of loads and bi-directional flows of power across the common bus.

6. The hybrid power and propulsion system according to claim 1, wherein:

one of the two or more storage elements comprises a battery.

7. The hybrid power and propulsion system according to claim 1, wherein the drive assembly comprises:

a fan or rotor; and a motor drive electrically interposed between the motor-generator and the common bus.

8. A hybrid power and propulsion system according to the hybrid power and propulsion system of the vehicle of claim 1, comprising:

the engine assembly as at least one auxiliary engine assembly;

the two or more storage elements are each one or more energy storage elements;

the two or more drive assemblies are each one or more drive assemblies; and the common bus comprising:

at least one first plug of the first plug type to which the at least one auxiliary engine assembly is connectable;

second plugs of the second plug type to which the one or more energy storage elements is connectable; and third plugs of the third plug type to which the one or more drive assemblies is connectable; and a controller operably coupled to the common bus and configured to ascertain the system configuration from respective connections to the first, second and third plugs.

9. The hybrid power and propulsion system according to claim 8, further comprising a set of loads, wherein the controller is further configured to control a flow of power to the set of loads and bi-directional flows of power with respect to each of the first, second and third plugs.

10. The hybrid power and propulsion system according to claim 8, wherein:

the auxiliary engine assembly comprises:

a gas turbine engine; and a motor-generator coupled to the gas turbine engine and configured to drive at least one spool of the gas turbine engine in a first engine configuration and to generate electricity in a second engine configuration.

11. The hybrid power and propulsion system according to claim 8, wherein at least one of the one or more energy storage elements comprises a battery.

12. The hybrid power and propulsion system according to claim 8, wherein at least one of the one or more energy storage elements comprises a fuel cell.

13. The hybrid power and propulsion system according to claim 8, wherein at least one of the one or more drive assemblies comprises:

a fan or rotor;

a motor-generator coupled with the fan or rotor; and a motor drive electrically interposed between the motor-generator and the common bus.

14. The hybrid power and propulsion system according to claim 13, wherein each of the one or more drive assemblies comprises a pair of ducted rotors coupled to a motor-generator configured to drive the pair of ducted rotors.

15. The hybrid power and propulsion system according to claim 8, wherein the controller is further configured to:

receive mission parameters associated with a mission for a vehicle associated with the hybrid power and propulsion system;

determine that a system configuration includes excess components based on the mission parameters; and cause at least one energy storage element or drive assembly to be removed from the hybrid power and propulsion system.

16. The hybrid power and propulsion system according to claim 8, wherein the controller is further configured to:

receive mission parameters associated with a mission for a vehicle associated with the hybrid power and propulsion system;

determine that a system configuration is insufficient to complete the mission based on the mission parameters; and cause at least one energy storage element or drive assembly to be added to the hybrid power and propulsion system.

17. A method of configuring a vehicle propulsion system according to the hybrid power and propulsion system of the vehicle of claim 1, the method comprising:

receiving mission parameters;

ascertaining the system configuration from respective connections of the engine assembly as an auxiliary engine assembly, the two or more storage elements which are each one or more energy storage elements and the two or more drive assemblies which are each one or more drive assemblies to first, second and third plugs of the first, second and third plug types of the common bus; and determining whether the system configuration accords with the mission parameters.

18. The method according to claim 17, further comprising:

based on a determination that the system configuration accords with the mission parameters, causing a first message to be presented via a display of a computing device, the first message including an indication that the system configuration accords with the mission parameters; or based on a determination that the system configuration does not accord with mission parameters, causing a second message to be presented via the display, the second message including an instruction to either add or remove a component to/from the vehicle propulsion system.

* * * * *